Jan. 1, 1957 B. J. SMITH 2,775,992
LOCK NUT COMPRISING A BARREL AND THREADED
LOCKING COIL RETAINED THEREIN
Filed Aug. 11, 1953 4 Sheets-Sheet 1

INVENTOR.
Byron J. Smith
BY *Walter S. Pleston*
Attorney

Jan. 1, 1957
B. J. SMITH
2,775,992
LOCK NUT COMPRISING A BARREL AND THREADED
LOCKING COIL RETAINED THEREIN
Filed Aug. 11, 1953
4 Sheets-Sheet 3
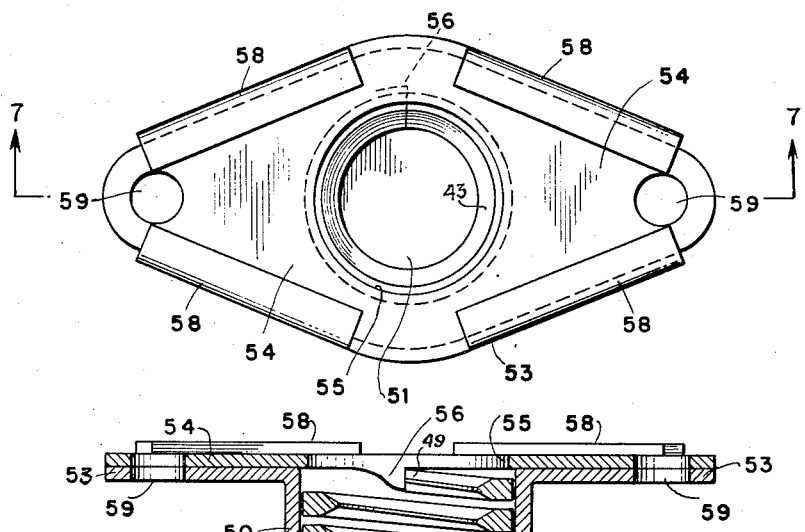
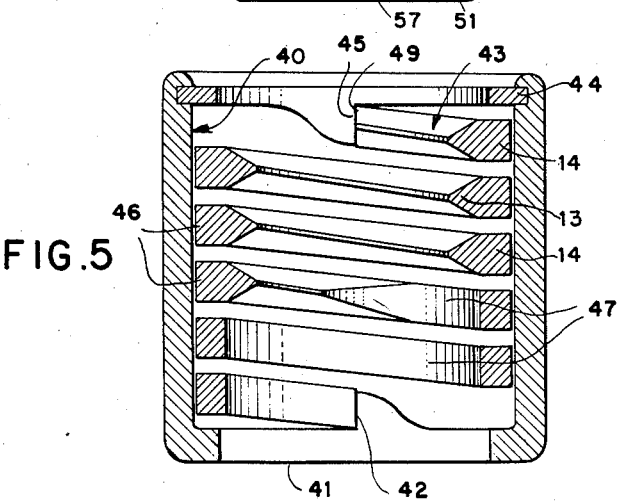
INVENTOR.
Byron J. Smith
BY Walter S. Pleston
Attorney Jan. 1, 1957 B. J. SMITH 2,775,992
LOCK NUT COMPRISING A BARREL AND THREADED
LOCKING COIL RETAINED THEREIN
Filed Aug. 11, 1953 4 Sheets-Sheet 4

INVENTOR.
Byron J. Smith
BY
Walter S. Pleston
Attorney

United States Patent Office

2,775,992
Patented Jan. 1, 1957

2,775,992

LOCK NUT COMPRISING A BARREL AND THREADED LOCKING COIL RETAINED THEREIN

Byrom J. Smith, Brookfield Center, Conn., assignor to Heli-Coil Corporation, Danbury, Conn., a corporation of Delaware Application August 11, 1953, Serial No. 373,573

5 Claims. (Cl. 151—14)

The present invention relates to a self-locking nut comprising a barrel and a screw thread insert coiled of a springy wire, wherein the resiliency of the wire furnishes the locking feature.

The invention essentially contemplates the provision of a nut body or barrel with a wire coil screw thread insert wherein the pitch of the coil convolutions is slightly different from that of the thread of the screw bolt or stud for which the nut is destined, and the convolutions are spaced from one another so that the spacing of convolutions engaged by the bolt or stud will be increased whereas the spacing of the remainder of the convolutions will be reduced, or that the spacing of the convolutions engaged by the bolt or stud will be reduced whereas the spacing of the remainder of the convolutions will be increased.

Another object of the invention is the provision of a nut of the mentioned type wherein the total length of the wire coil insert is predetermined and invariable whereas the spacing of the convolutions will change when the nut is applied to a bolt or stud.

The nut according to the invention can be so formed as to serve most of the purposes of an ordinary nut. In addition its type is of particular advantage when used as a cap nut owing to its characteristics which require that a portion of the total length of the wire coil remains non-engaged by the bolt or stud to which the nut is applied, with the effect in certain instances that the bolt or stud cannot be screwed through the whole length of the nut. A cap nut according to the invention can be so formed that it is not only self-locking, but that it can furnish a liquid- and gas-tight screw connection.

Further objects and details of the invention will be apparent from the description given hereinafter and the accompanying drawing illustrating several embodiments thereof by way of example.

Figure 1:
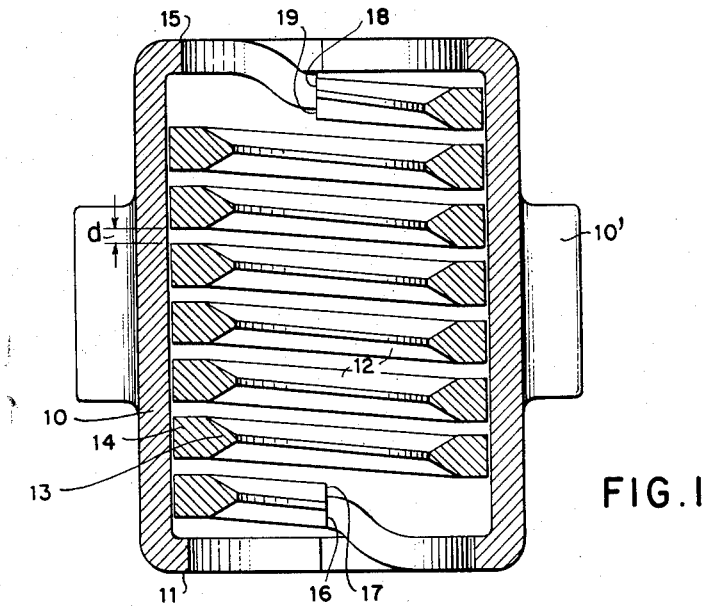
Fig. 1 is a longitudinal section of a nut according to the invention.
Figure 2:
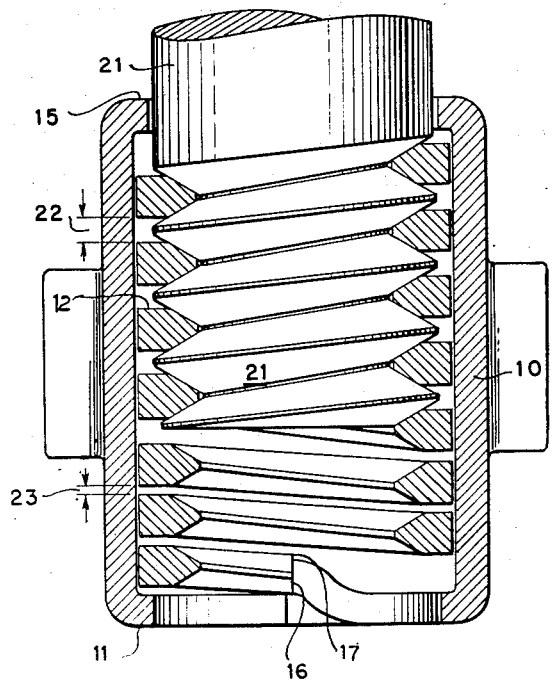
Fig. 2 is a similar section of the same nut applied to a screw threaded stud.
Figure 3:
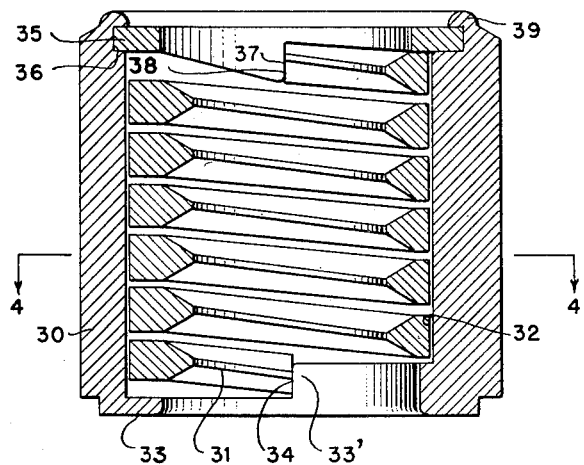
Figure 4:
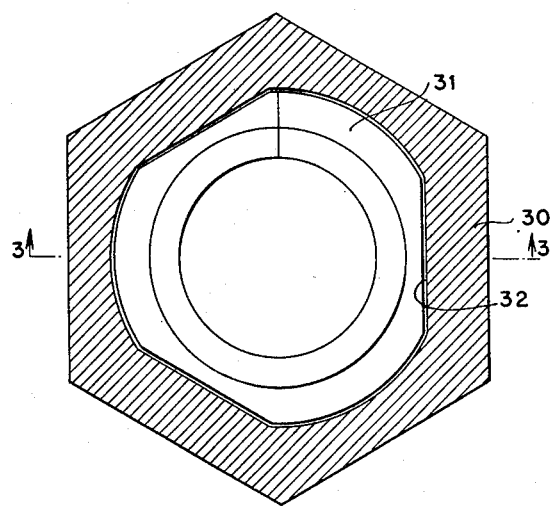
Figure 8:
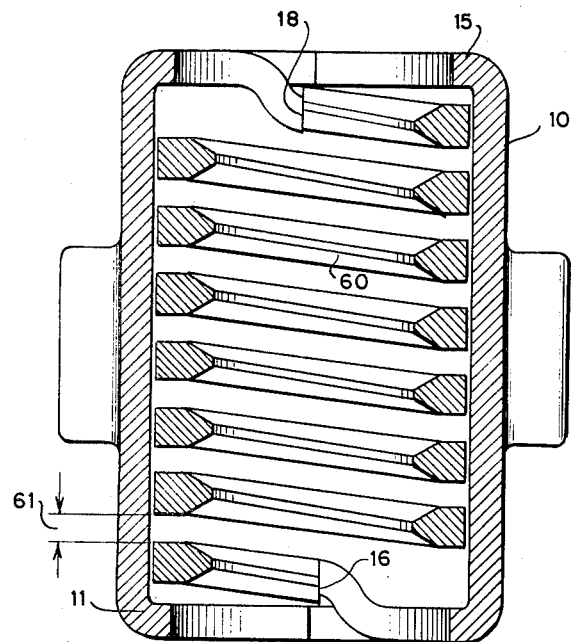
Figure 9:
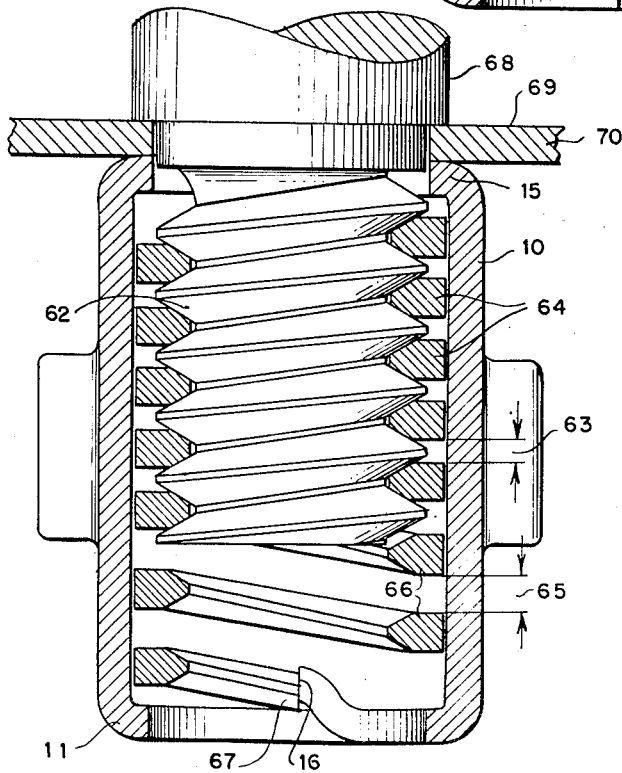

Fig. 3 is a longitudinal cross-section of another embodiment, the section being taken along line 3—3 of Fig 4, Fig. 4 is a section of the barrel along line 4—4 of Fig. 3, the insert being shown in a top plan view, Fig. 5 is a cross-section of a nut with a modified insert, Fig. 6 is a top plan view of a cap nut in the form of an anchor nut which may be made vapor proof, Fig. 7 is a cross-section along line 7—7 in Fig. 6, and Figs. 8 and 9 are sections similar to Figs. 1 and 2, respectively, of still another embodiment.

Referring now to the drawing, the nut illustrated in Figs. 1 and 2 comprises a hollow cylindrical body or barrel 10 with wings 10' or other conventional means for the application of a torque. The barrel has a bottom flange 11, and a coil 12 of a resilient wire is inserted into the barrel so as to bear on the flange 11. The wire cross-section of the illustrated example substantially consists of a triangular inner portion 13 which forms a female thread in the coil, and an outer rectangular portion 14, which may bear against the inner face of the barrel side wall. The flange 11 projects from the barrel wall inwardly slightly less than the rectangular portion of the wire cross-section. The top rim 15 of the barrel is spun over after the insertion of the coil so as to form a top flange similar to the bottom flange 11. An abutment 16 for the end 17 of the coil is provided on the bottom flange 11 of the barrel. This may be done e. g. either by stamping or pressing a tongue-like piece of the flange 11 so as to project into the interior of the barrel, or by soldering a piece to the inner face of the flange or by any other suitable and conventional means. A similar abutment 18 for the end 19 of the coil is provided on the inside of the top flange 15. The coil 12 is so wound and dimensioned that it is under a slight compression in the finished nut and that the ends 17 and 19 bear against the abutments 16 and 18 respectively. Furthermore, the pitch of the coil convolutions of the illustrated embodiment is slightly smaller than that of the thread of the screw bolt or stud for which the nut is destined, and the total length of the coil is larger than the length of the thread of the screw to be engaged by the coil convolutions. The convolutions of the coil prior to the engagement are equally spaced a predetermined distance $d$ from one another. Owing to the mentioned difference in pitch and on account of the resiliency of the coil, the interstices between the convolutions engaged by the bolt or stud will be increased as the bolt or stud is screwed in, whereas the spacing between the non-engaged convolutions will be accordingly decreased as the length of the coil does not vary. If, for instance, it is desired that seven convolutions defining six interstices shall be engaged, and that the difference in pitch of the non-engaged coil and the screw thread is .02", then the total increase of the interstices will be $6 \times .02 = .12"$. If it is further assumed that the maximum space permissible between two adjacent convolutions is .04", it follows that there must be three non-engaged convolutions and that the minimum number of convolutions of the coil will be 10.

Fig. 2 shows the nut of Fig. 1 with a bolt or stud 21 screwed into the coil 12. In consequence, the interstices 22 between engaged convolutions are greater than $d$ in Fig. 1 whereas the interstices 23 between the non-engaged convolutions are much smaller and will become zero if the bolt or stud 21 would be screwed in a little farther than shown. The resiliency of the coil causes the self-locking property of the nut. In that respect it will also be noticed that there is always a very considerable friction between the coil and both flanks of the screw thread. This friction is maintained owing to the high compression of the coil part which is not engaged. It will also be clear that there is a limit to which the bolt or stud can enter the nut. This limit is reached when the non-engaged convolutions bear closely upon one another.

In the form of Figs. 1 and 2, the torque between the screw bolt and the nut will be transmitted only through the one coil end bearing against the adjacent flange tongue unless an appreciable friction is set up between the coil and the barrel wall. However, this may be insufficient in cases where considerable forces occur. In such instances the form of the nut of Figs. 3 and 4 is recommended. This nut comprises the barrel 30 of hexagonal outer contour and the insert coil 31 which are non-cylindrical in cross-section as clearly shown in Fig. 4. The wire of which the insert is coiled has originally a cross-section similar to that of the coil 12 in Fig. 1. After the coiling the circumference of the coil is provided with e. g. three plane faces 32. The interior of the barrel is so shaped that it fits the resulting outer contour of the coil wherefore on the right hand side of Fig. 3 the wall of the barrel 30 appears thicker and the wire-cross-section of the coil 31 appears smaller than on the left hand side. Thus a torque will be directly transmitted from the barrel side wall to the coil which is held non-rotatable therein. In addition, the barrel is provided with a lower flange 33 which may be stepped at 33' so as to form an abutment for the lower coil end 34. At the upper end of the barrel a ring 35 is seated on a shoulder 36 of the barrel and abuts with a step 37 against the end 38 of the coil. However, in most instances where the barrel and coil are non-cylindrical the abutments for the coil ends will not be necessary. The ring 35 is pressed down on the coil by the rim 39 of the barrel which is turned inward upon the ring whereby the desired pre-compression is set up and the desired pitch is adjusted in the coil. It will be clear that the nut of Figs. 3 and 4 has a similar self-locking effect as the nut of Fig. 1.

It has been stated that in a nut of the type described the depth to which a bolt or stud can be screwed in is limited and cannot be increased when the non-engaged convolutions bear upon one another. However, such limitations can be avoided if the coil is so formed that only those convolutions which are intended to be engaged by a bolt or stud have the female thread-forming portions whereas the convolutions which are not to be engaged have no such portions. A nut of such a type is shown in Fig. 5. The nut comprises a barrel 40 with bottom flange 41 and abutment 42 thereon. The coil 43 is inserted in the barrel and bears with one end against the abutment 42 and with its other end against an abutment 45 provided on a top ring 44 which is similar to ring 35 in Fig. 3. The cross-sections of the engageable convolutions 46 of the coil 43 include the triangular portions 13 and the rectangular portions 14 whereas the cross-sections of the non-engageable convolutions 47 consist only of the rectangular portions 14. When in this nut the pitch and the spacing of the convolutions 46 are so dimensioned that an engagement of all the convolutions 46 would not require a reduction of the spacing of the convolutions 47 beyond the actually available spacing, the bolt or stud can be screwed through the total length of the nut. Otherwise, the depth to which the bolt or stud can penetrate in the nut would be limited as in the case of the nut of Fig. 1.

The possibility of selectively making the nut so that this depth will be limited or not limited is of particular advantage in a cap nut as e. g. the anchor nut of Figs. 6 and 7. In this nut the barrel 50 is provided with a closed bottom 51 and a top forming a flange 53 which extends towards opposite sides as clearly shown in Fig. 7. A cover plate 54 is placed on the flange 53 after the insertion of the coil 43 which is of the type of Fig. 5. It is, of course, possible too to form the barrel and coil cross-section as shown in Fig. 3. The plate 54 is provided with a central hole 55 large enough for the passage of a stud intended for engagement with the nut, and also with an abutment 56 for the upper coil end 49. An abutment 57 for the other coil end is soldered or welded to the barrel bottom 51. The edge of the flange 53 is turned over the edge of the plate in four portions 58 so as to hold the plate firmly pressed down on the coil which is under compression as hereinbefore explained. Two holes 59 are drilled through the flange 53 and the cover plate 54 for the purpose of securing the nut to a support or base by means of screws not shown.

Provided the coil is properly dimensioned as to original pitch, spacing and number of convolutions, a stud may be screwed into the nut until the spacing between non-engaged convolutions has been reduced to zero. No other abutment is required to limit the depth to which the stud should enter the nut. On the other hand, if the nut is intended to receive a screw bolt e. g. for tightening a part on a member to which the anchor nut is screwed, it may be preferable to employ a coil in which the increase of the spacing of all the convolutions engaged by the bolt does not reduce the spacing of the non-engaged convolutions to zero. Thereby it is attained that the bolt can enter the nut as far as the connection may require without a predetermined limitation except by the total length of the nut barrel. As stated above a nut of this type will not only be self-locking but can readily be made vapor-proof.

In all the nuts described hereinbefore the spacing of the coil convolutions i. e. the pitch of the coil is originally smaller than that of the bolts or studs to which the nuts are intended to be applied. In the nut illustrated in Figs. 8 and 9 the reverse is the case. In these figures the barrel 10 is of the same structure as the barrel in Figs. 1 and 2. The barrel has the flanges 11 and 15 and the abutments 16 and 18 as hereinbefore described. Coil 60, however, differs from coil 12 of Fig. 1 in two respects. Although the coil wire has the same cross-section, the interstices 61 between the coil convolutions in Fig. 8 are larger than in Fig. 1 so much so that the pitch of the coil is larger than that of the bolt or stud 62 shown in Fig. 9. If, then, the nut is applied to the bolt or stud the interstices 63 between the engaged convolutions 64 will be reduced whereas the interstices 65 between the non-engaged convolutions 66 are increased. In order to ensure proper functioning of the nut in that respect, it is necessary that the compression under which the coil 60 is originally installed in the barrel, is so high that the non-engaged convolutions are still under some compression when the nut is applied to the bolt or stud. Otherwise there is the danger that the lower coil end 67 leaves the abutment 16. Similarly, it must be prevented that the bolt 62 engages all the convolutions of the coil 60. For that reason means may be provided to limit the depth to which the bolt may enter the nut. An adequate means for that purpose is e. g. the collar 68 which is integral with the bolt 62 and which bears on the top face 69 of a member 70 connected by the nut to the bolt.

All the nuts illustrated and hereinbefore described have in common a barrel in which a wire coil is inserted. The coil wire is of such a cross-section throughout at least the major part of the coil as to form an internal thread, and has an outer face of such a shape, that the convolutions of the coil bearing against the inner wall of the barrel can move in the axial direction. The coil is compressed and prevented from turning within the barrel. It is wound with interstices between the convolutions. The pitch of the coil helix is different from that of the thread of the bolt or stud for which it is destined, and the total number of the coil convolutions is larger than the number of the thread convolutions of the bolt or stud which can engage the coil convolutions.

It will be apparent to those skilled in the art that many alterations and modifications of the structures shown and described may be made without departure from the essence and spirit of the invention which for that reason shall not be limited but by the scope of the appended claims.

I claim:

1. A lock nut comprising a barrel open at least at one of its ends, a resilient, axially compressed, wire coil inserted in said barrel, said barrel including inner shoulders at its top and bottom against which said compressed coil permanently bears with its ends, respectively, thereby defining the unchanging axial length of said coil, each shoulder having an abutment surface in a radial plane including the axis of the barrel, said coil being held with its ultimate ends in permanent engagement with said abutment surfaces, respectively, the inner portion of at least the major part of said coil forming a female thread of a shape corresponding to a pitch different from that of a screw bolt or stud for which the nut is destined, and the convolutions of said coil in said barrel between said ultimate ends being spaced from one another and free to shift in the axial direction with respect to one another and to said barrel, whereby the total change of the spacing of convolutions when engaged by said screw bolt or stud will be balanced by a total converse change of the spacing of the non-engaged convolutions, and the total number of convolutions of said coil being larger than its number of convolutions engageable by said bolt or stud.

2. A lock nut as claimed in claim 1, the total number of said coil convolutions being larger than the number of the thread convolutions of said bolt or stud to be engaged by said coil convolutions.

3. A lock nut as claimed in claim 2, wherein the original pitch of the coil is larger than that of said screw bolt or stud, and the original compression of the coil in the barrel is such that the non-engaged convolutions of the coil are still compressed when the spacing of the other convolutions has been decreased owing to the engagement with the thread of said bolt or stud.

4. A lock nut as claimed in claim 1, said barrel having a non-circular inner contour of said barrel and said coil having a matching outer contour.

5. A lock nut as claimed in claim 1, the inner diameter of a minor part of said coil being slightly larger than the major diameter of said female thread, whereby the total change of the spacing of the thread forming convolutions when engaged by said screw bolt or stud will be balanced by the total converse change of the spacing of the convolutions of said minor part.

References Cited in the file of this patent

UNITED STATES PATENTS

| | | |
|---|---|---|
| 267,423 | Harrington | Nov. 14, 1882 |
| 782,349 | Marshall | Feb. 14, 1905 |
| 792,292 | Smith | June 13, 1905 |
| 1,830,920 | Sundh | Nov. 10, 1931 |
| 2,386,197 | Dawson | Oct. 9, 1945 |
| 2,387,257 | Haas | Oct. 23, 1945 |
| 2,407,879 | Haas | Sept. 17, 1946 |
| 2,464,808 | Hattan | Mar. 22, 1949 |
| 2,515,220 | Hattan | July 18, 1950 |